Sept. 29, 1970 — M. P. DE LISIO — 3,530,645
COLLECTOR PLATE CONSTRUCTION
Filed March 21, 1968
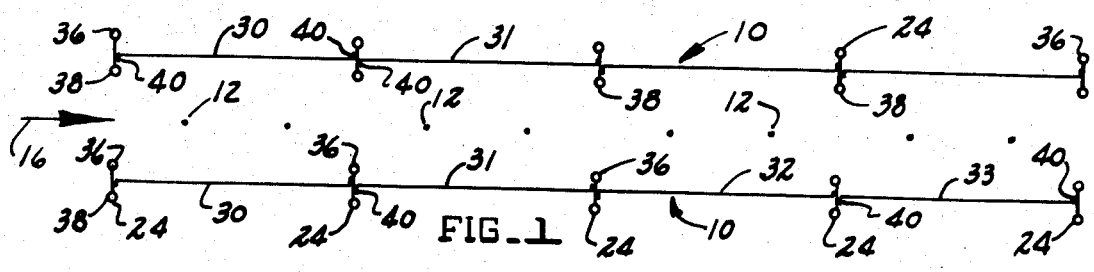
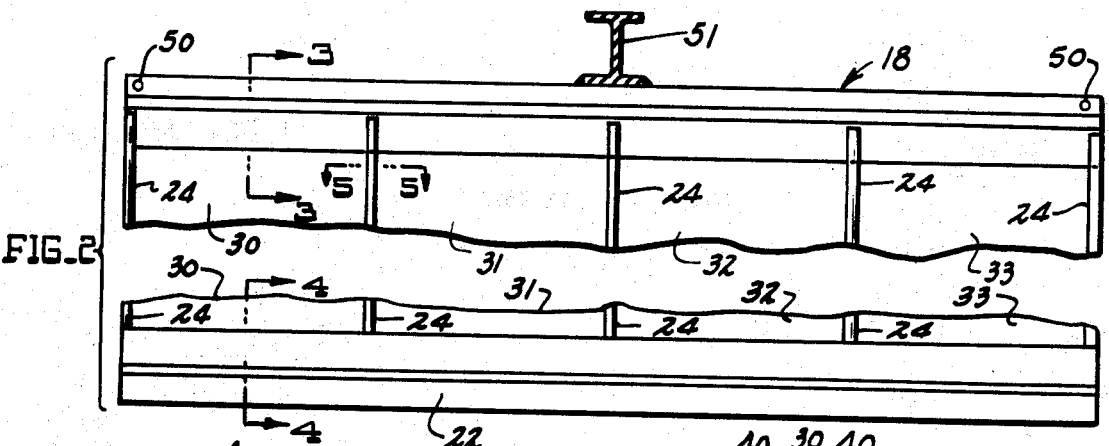
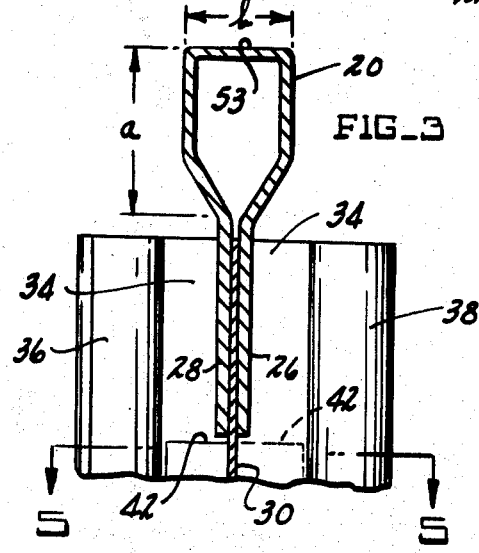
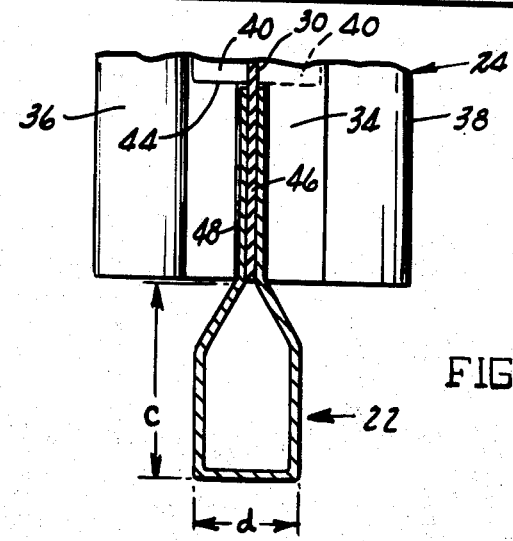
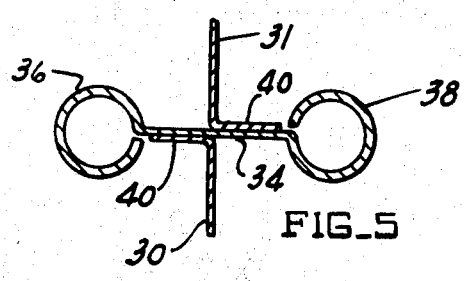
INVENTOR.
MICHAEL P. DE LISIO
BY
JOHN E. McRAE
ATTORNEY

United States Patent Office 3,530,645
Patented Sept. 29, 1970

3,530,645
COLLECTOR PLATE CONSTRUCTION
Michael P. De Lisio, 5228 N. Pebblecreek Road,
Birmingham, Mich. 48010
Filed Mar. 21, 1968, Ser. No. 715,006
Int. Cl. B03c 3/76
U.S. Cl. 55—112
5 Claims

ABSTRACT OF THE DISCLOSURE

This invention proposes a collector plate construction for electrostatic precipitators wherein the plate is formed by a rigid framework and a series of panels attached thereto. Rapper force applied to the framework causes vibratory impulses to be set up about substantially the entire periphery of each panel so that dust accumulations are dislodged from all panel surfaces. The framework rigidifies the collector plate construction and prevents twisting thereof during transit from factory to site of installation, as well as during erection of the precipitator. By making the framework separate from the panels it is possible for each of them to use the gage material which is most appropriate to its respective structural and functional character, thus minimizing costs and improving performance.

THE DRAWINGS

FIG. 1 is a schematic plan view of a portion of a precipitator embodying the collector plate construction of this invention.

FIG. 2 is a side elevational view of the FIG. 1 plate construction, showing the upper and lower edge portions only.

FIG. 3 is an enlarged sectional view taken on line 3—3 in FIG. 2.

FIG. 4 is an enlarged sectional view taken on line 4—4 in FIG. 2.

FIG. 5 is an enlarged sectional view taken on line 5—5 in FIGS. 2 and 3.

GENERAL ARRANGEMENT

FIG. 1 looks down on a portion of an industrial single stage electrostatic precipitator having a number of spaced pocket-type collector plates 10 and intervening ionizer wires 12. Two collector plates are shown but in practice there are several plates, as for example twenty or more. The space between adjacent collector plates is commonly termed a duct, and the dusty gas is moved by a fan (not shown) through each duct in the arrow 16 direction. As the gas moves through the duct any dust particles therein are electrically charged (usually negatively) by the vertical wires 12, which are connected to a high voltage power source (not shown), for example 30 k.v. or higher. The charged dust particles are attracted to the collector plates which are of an opposite polarity from the wires (the plates are thus usually positive or ground potential).

The plates and wires are suspended from above, as for example shown generally in U.S. Pat. 3,354,617 issued to E. C. Hoisington et al. Thus, the wires hang in spaced parallelism with one another, and the gas flows horizontally through the ducts in giant vertical slices. In practice the collector plates may be on the order of six or nine feet wide (arrow 16 direction) and thirty feet high (normal to the plane of the paper in FIG. 1). The plates may be spaced approximately nine inches apart, with the ionizer wires midway between adjacent plates, i.e. about four and one half inches from each plate.

Conventionally the collector plates are periodically oscillated or rapped at selected locations and intervals for the purpose of dislodging dust accumulations thereon. Should dust accumulations build up too thick on the plates the resulting electrical resistance from plate to free dust particle may become too large; also the dust accumulations may re-entrain in the gas stream. Rapping the collector plates causes dust accumulations to be mechanically sheared or dislodged from the plate surface so that gravitational forces can move it down relative to the plate. Each collected dust particle can thus directly or eventually fall into a subjacent hopper or other removal mechanism (not shown). The rapping force may be supplied for example by pneumatic or electromagnetic force devices operating at a suitable number of raps per minute. In actual practice the rate and amplitude or rapping is sometimes adjusted at the installation on the basis of prevailing dust loading, particle size, resistively, gas velocity, etc.

COLLECTOR PLATE DESIGN

The illustrated collector plate comprises a rigid framework 18 which includes an upper beam 20 and five vertical tie bars 24 depending therefrom; the number of tie bars is a function of the plate width (arrow 16 direction). A lower beam 22 is also provided. FIG. 2 shows only the upper and lower edge portions of the collector plate, but it will be appreciated that in practice the plate may be considerably elongated in the vertical dimension so that bars 24 will be considerably longer than the two beams 20 and 22. Bars 24 impart vertical stiffness and bend resistance to the collector plate. Beams 20 and 22 impart horizontal stiffness.

As shown in FIG. 3, upper beam 20 comprises a tubular structure having two depending flanges 26 and 28 which facially engage the upper edge areas of flat metal panels 30 through 33 (see FIG. 2). These panels are hung from the beam, preferably by spot welds going through the panels and beam flanges 26 and 28, the welds being spaced for example on five inch centers along the length of the beam.

Each vertical tie bar 24 comprises a web wall 34 having integral tubular reinforcements 36 and 38 at its opposite side edges. These reinforcements extend substantially the full length of the bar. Preferably the bar is formed of steel, and the reinforcements can then be formed by cold rolling operations. Reinforcements 36 and 38 not only strengthen the bar but also avoid sharp projecting corner surfaces; they thus minimize electrical field stress.

Each bar 24 is solidly affixed to the flanges 26 and 28 of beam 20. Toward this end the upper edge of web wall 34 may be provided with a vertical notch having a width corresponding to the combined thickness of flange 26, panel 30, and flange 28. Each bar 24 may then have its notch fit the vertical edges of flanges 26 and 28; seam welds may be applied at the joining interior corners. If additional strength is necessary gussets (not shown) may be provided at the joining corners.

As illustratively shown in FIG. 5, each panel 30 through 33 is provided with a right angle flange 40 along each of its vertical edges. These flanges 40 extend the full vertical length of the panel except for short distances at the panel upper and lower edges. Thus, as shown in FIG. 3, the illustrative flange 40 terminates at 42 to permit the panel upper edge to fit between beam flanges 26 and 28. Similarly, as shown in FIG. 4, the flange 40 terminates at 44 to permit the panel lower edge to fit between flanges 46 and 48 of beam 22. Flanges 40 of each panel are preferably spot welded to web walls 34 at spaced points therealong, as for example every eighteen inches.

As shown in the drawings, the lower edge of each bar 24 is formed with a notch having the same dimension as the notch in the bar upper edge. This lower notch may fit around flanges 46 and 48. However beam 22 is illustratively of a lighter gage than beam 20 so that the lower notch has clearance with flanges 46 and 48; it is not essential that each web wall 34 be welded to beam 22. Beam 22 is connected to the lower edge area of each panel 30 through 33, as by spot welds going through the panel and beam flanges 46, 48 at spaced points therealong. Beam 22 aligns the lower edge areas of the various panels, and the panels act through their flange 40 connections with bars 24 to maintain each of the bars in planar alignment with one another. A somewhat more rigid framework can be provided by connecting bars 24 directly to beam 22, as by means of gussets (not shown) at the notch type joint shown in FIG. 4.

It will be noted that each of the rigidifying framework elements 20, 22, and 24 includes tubular construction therein. Such construction is of material assistance in prevention of bowing or bending, either during transit, installation, or service. The size of conventional precipitators is such that the precipitator must usually be erected at the job site, as opposed to being merely installed bodily. Thus, the various collector plates can be shipped separately on railroad flat cars or truck, and are hung from overhead supports during the erection process. Cranes are employed to transfer the plates during loading on the cars, unloading and erection; the plates may thus swing about and strike adjacent structures so as to become twisted, thus rendering them useless (because they then do not have the desired spacing from wires 12). In some cases the mere weight of conventional plates in conjunction with their low strength is sufficient to cause panel deformation under even normal handling procedures. The illustrated collector plate construction is believed to be stronger and more twist-resistant than conventional collector plates which are commonly formed without a separate rigidifying framework similar to framework 18. In conventional structures the panels are factory bent or deformed at their marginal edges in an attempt to provide reinforcement. However it is difficult to work or deform all margins of the panels to the extent necessary to achieve tubular reinforcement both vertically and horizontally. The illustrated design effectively achieves such reinforcement.

Support for the collector plates is provided by suspension devices going through holes 50 at opposite ends of each plate. During service the collector plates are continuously or intermittently rapped, as by rapper devices (not shown) operatively connected as for example with a transverse I-beam 51 welded to the beam member 20 of each collector plate. Beam 51 could also be connected to the collector plates at other locations thereon, as for example at the mid points of the end ones of the various bars 24. In the illustrated arrangement hammer blows delivered onto beam 51 are transmitted by that beam to each individual beam 20. The connection between beam 51 and each beam 20 must be unyielding or non-flexible for the desired force transmission; accordingly each beam 20 is provided with a flat upper face 53 which achieves extensive facial contact with the I-beam for a rigid weld joint.

The aforementioned rapping force produces an oscillation of each beam 20. Since bars 24 are rigidly affixed to beam 20 they also move vertically without any motion loss between the beam and bars. As before mentioned, bars 24 are reinforced against bending by reason of their rolled edges 36 and 38. Therefore during rapping they remain stiff and non-flexible, thus transmitting the vertical motion throughout their full length without absorbing the stress in a bending type of strain. Panels 30 through 33 receive the vibrational forces from beam 20 and also from bars 24 via the various welds along the panel upper edge and flanges 40. In effect the vibration of each panel is propagated from points along almost the entire periphery of each panel. There is an absence of the vibration dampening which occurs in conventional arrangements not having the separate framework-panel construction.

Framework elements 20, 22 and 24 may, and preferably are, formed of different gage material than panels 30 through 33; also beam 20 may be of heavier gage than bars 24 or beam 22 since in accordance with its heavier loading. The framework preferably acts as a rigid, bodily-movable mass, while the panels act as flexible diaphragm type structures. The panels thus can move both vertically and also transversely in a weaving mode to thus better dislodge the dust accumulation. Use of thinner gage material for the panels has a considerable cost advantage. Usually it is advantageous to form panels 30 through 33 of relatively thin gage material; however under some corrosive conditions it may be desirable to form the panels of relatively heavy gage material. The use of separate framework and panel components permits a wide latitude in design to achieve optimum results in both performance and cost.

Preferably beams 20 and 22 have tubular cross sections which are elongated in the vertical dimension and shortened in the horizontal direction. Thus, in FIG. 3 dimension $a$ is greater than dimension $b$, and in FIG. 4 dimension $c$ is greater than dimension $d$. By making dimensions $b$ and $d$ relatively small I avoid the problem of short circuiting between the wires and plates.

Some cost reduction is achievable if parts are interchangeable, end for end. Thus, each bar 24 is notched at its opposite ends, and the notches are the same width and depth; this enables more economical notch formation and easier handling of the bars, since either end can be the "up" end. Similarly each panel has flanges 40 which terminate the same distance from the horizontal edge (upper and lower). Therefore the panel can be positioned with either of its horizontal edges at the top, thus easing the problem of moving these panels around during fabrication.

It will be appreciated that some variation in structural detail may be utilized without departing from the spirit of the invention as comprehended by the attached claims.

I claim:

1. In an electrostatic precipitator comprising rows of ionizer wires hung in the spaces between suspended collector plates, said plates forming ducts for gas passing through the aforementioned spaces, said plates having rapper means associated therewith for imparting oscillatory motion thereto so as to dislodge dust accumulations from the collector plate surfaces: the improvement wherein each collector plate comprises an upper horizontal beam 20 extending the horizontal length of the collector plate, vertical tie bars 24 secured to and depending from the upper beam at spaced points therealong, and individual panels 30, 31, 32 or 33 joined to the upper beam and to adjacent tie bars; said upper beam having a tubular cross section and at least one depending flange 26 or 28, said panels having their upper edge areas facially overlapping the beam flange and joined thereto along the beam length so that vibratory movement of the beam is transmitted to the panels; each vertical tie bar comprising a web wall 34 extending normal to the panel plane so that each half of the web wall projects beyond a different face of the adjacent panel by approximately the same distance; said web wall having its opposite vertical edge portions oriented to form tubular reinforcements 36 and 38; said panels having their vertical edge areas 40 turned into facial engagement with the web wall portions of the adjacent tie bars, said edge areas 40 being joined to the tie bars along the tie bar length, whereby vibratory movement of each tie bar is transmitted to the panels.

2. The precipitator of claim 1 wherein the depending flange 26 or 28 is provided with transverse notches therethrough, each vertical tie bar having the upper edge area of its web wall 34 extending through one of the notches.

3. The precipitator of claim 1 wherein the upper beam is provided with two spaced parallel flanges 26 and 28 arranged to facially engage opposite face areas of a panel in sandwich-like fashion.

4. The precipitator of claim 1 wherein the upper beam is contoured to have a flat upper face 53 operable to withstand extensive rapper forces.

5. The precipitator of claim 1 and further comprising a lower horizontal beam 22 extending the horizontal length of the collector plate; said lower beam having a tubular cross section and at least one flange 46 or 48; said panels having their lower edges facially overlapping the beam flange 46 or 48 and joined thereto along the beam length.

References Cited

UNITED STATES PATENTS

| | | | |
|---|---|---|---|
| 1,345,790 | 7/1920 | Lodge | 55—130 |
| 1,903,640 | 4/1933 | Wintermute | 55—122 |
| 2,532,734 | 12/1950 | Schmidt | 55—148 |
| 2,631,686 | 3/1953 | Andres | 55—130 |
| 3,125,426 | 3/1964 | Herber et al. | 55—130 |

FOREIGN PATENTS

| | | |
|---|---|---|
| 645,788 | 7/1962 | Canada. |
| 464,858 | 12/1928 | Germany. |
| 975,489 | 12/1961 | Germany. |
| 822,593 | 11/1959 | Great Britain. |

DENNIS E. TALBERT, JR., Primary Examiner

U.S. Cl. X.R.

55—130, 140, 156